United States Patent
Koinuma et al.

(10) Patent No.: US 11,987,159 B2
(45) Date of Patent: May 21, 2024

(54) CONNECTION MEMBER

(71) Applicant: HONDA ACCESS CORP., Niiza (JP)

(72) Inventors: Yasuhiro Koinuma, Niiza (JP); Hideki Oino, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 374 days.

(21) Appl. No.: 17/429,499

(22) PCT Filed: Mar. 8, 2019

(86) PCT No.: PCT/JP2019/009285
§ 371 (c)(1),
(2) Date: Aug. 9, 2021

(87) PCT Pub. No.: WO2020/183517
PCT Pub. Date: Sep. 17, 2020

(65) Prior Publication Data
US 2022/0126740 A1   Apr. 28, 2022

(51) Int. Cl.
*B60R 13/01* (2006.01)
*B60N 2/64* (2006.01)
*B60N 3/04* (2006.01)

(52) U.S. Cl.
CPC ............. *B60N 3/048* (2013.01); *B60N 2/64* (2013.01); *B60N 3/046* (2013.01); *B60R 13/013* (2013.01)

(58) Field of Classification Search
CPC .............. B60R 13/01; B60R 2013/018; B60R 2013/0268; B60R 2013/0275;
(Continued)

(56) References Cited

U.S. PATENT DOCUMENTS

| | | | | |
|---|---|---|---|---|
| 4,848,826 A | * | 7/1989 | Kuwabara | B60N 2/3009 296/37.16 |
| 4,979,772 A | * | 12/1990 | Carey | B60N 2/3011 296/97.23 |

(Continued)

FOREIGN PATENT DOCUMENTS

| | | | | |
|---|---|---|---|---|
| DE | 3334314 | * | 9/1983 | E05D 1/02 |
| FR | 2 959 975 A1 | | 11/2011 | |

(Continued)

OTHER PUBLICATIONS

Comptuer generated translation of DE 3334314 (Year: 1983).*

(Continued)

*Primary Examiner* — Gregory A Blankenship
(74) *Attorney, Agent, or Firm* — WHDA, LLP

(57) ABSTRACT

Provided is a connection member that is to be bridged between a seat back and a luggage room floor, and stretches and contracts as at least one of the seat back and the luggage room floor moves. The connection member has a main body portion formed into the shape of a thin plate or a sheet; and a plurality of long convex portions provided on the main body portion in a parallel manner. The long convex portions are extendedly provided in a direction orthogonal to a direction along which the connection member stretches and contracts. As the seat back and the luggage room floor approach each other, a first bending portion and second bending portion having the plurality of the long convex portions will be bended in a manner such that the plurality of the long convex portions will be positioned inward.

18 Claims, 8 Drawing Sheets

(58) Field of Classification Search
CPC ............ B60R 2013/06; B60N 2/02246; B60N 2/02253; B60N 2/046; B60N 2/048; B60N 2/06; B60N 2/07; B60N 2/0722; B60N 2/0725; B60N 2/073; B60N 2/075; B60N 2/3004; B60N 2/3009; B60N 2/3011; B60N 2/3013; B60N 2/36; B60N 2/64; B60N 2002/363; B60N 3/048; B60J 7/06; B60J 7/062; B60J 7/041; B60J 7/067; B60J 7/068; B60J 7/141; B60J 10/277; E06B 3/48; E06B 3/481; E06B 3/486; E06B 7/16; E06B 7/367; E06B 2009/1555; E06B 2009/1561; E05D 1/02; E05D 9/00; E04C 2/243; E04C 2/405
USPC ........... 296/65.09, 141–143, 100.09; 160/32; 49/9, 492.1
See application file for complete search history.

(56) References Cited

U.S. PATENT DOCUMENTS

| | | | | |
|---|---|---|---|---|
| 5,322,335 | A * | 6/1994 | Niemi | B60N 3/042 296/97.23 |
| 6,206,443 | B1 * | 3/2001 | Konop | B60R 13/01 229/164 |
| 6,623,061 | B2 * | 9/2003 | Tourangeau | B60N 2/58 296/65.01 |
| 7,475,954 | B1 * | 1/2009 | Latunski | B60R 11/00 312/297 |
| 8,196,990 | B2 * | 6/2012 | Aebker | B60N 2/36 296/69 |
| 10,279,713 | B2 * | 5/2019 | Watanabe | B60N 2/36 |
| 11,142,136 | B2 * | 10/2021 | Deshpande | B62D 33/0273 |
| 2004/0118851 | A1 * | 6/2004 | Shinomiya | B60R 7/04 220/348 |
| 2008/0185866 | A1 * | 8/2008 | Tarrant | B60R 5/04 296/97.22 |
| 2010/0257788 | A1 * | 10/2010 | McRoskey | E06B 7/367 49/506 |
| 2012/0049588 | A1 * | 3/2012 | Baker | B60N 2/3011 297/313 |
| 2012/0049596 | A1 * | 3/2012 | Baker | B60N 2/305 297/313 |
| 2017/0088027 | A1 * | 3/2017 | Watanabe | B60N 2/36 |
| 2021/0009014 | A1 * | 1/2021 | Kondo | B60N 2/30 |
| 2022/0126740 | A1 * | 4/2022 | Koinuma | B60N 3/048 |
| 2022/0266767 | A1 * | 8/2022 | Zhang | B60N 2/34 |

FOREIGN PATENT DOCUMENTS

| | | |
|---|---|---|
| JP | 5-2359 Y2 | 1/1993 |
| JP | 8-295168 A | 11/1996 |
| JP | 9-252919 A | 9/1997 |
| JP | 10-129325 A | 5/1998 |
| JP | 2010-195101 A | 9/2010 |
| JP | 2013-209002 A | 10/2013 |

OTHER PUBLICATIONS

International Search Report dated May 28, 2019, issued in counterpart International Application No. PCT/JP2019/009285. (2 pages).

* cited by examiner

CONNECTION MEMBER

TECHNICAL FIELD

The present invention relates to a bendable connection member that is to be bridged between a first attachment receiving portion and a second attachment receiving portion.

BACKGROUND ART

Conventionally, there is known a bridging carpet that is to be bridged between a seat back of a vehicle and a luggage platform (luggage room floor) of a luggage room provided behind the seat, the seat back being one that can be raised to a raised state where the seat back is used as a backrest by a passenger seated, and tilted to a forward-tilted state where the seat back has been tilted forward and a back surface thereof can be used as a luggage platform (e.g. Patent document 1).

In addition to a joining end portion on a seat back side and a fixation end portion on a luggage platform side, the bridging carpet disclosed in Patent document 1 has a valley-shaped fold portion dangling between the luggage platform and the seat back; and a protruding portion protruding from the fixation end portion on the luggage platform side toward the seat back. The bridging carpet is made of a piece of a carpet material; the joining end portion, the fold portion, the protruding portion and the fixation end portion are continuously formed in such order.

Further, an intermediate portion of the fold portion of the bridging carpet is such that a bended state thereof is maintained by stitching; there is established a state where a crease has been made. Moreover, the protruding portion is such that the carpet material has been turned into double layers as a result of being folded back in a loop-like fashion, and that as a result of performing stitching with a base end portion of the protruding portion sandwiching a part of a rigid plate that protrudes forward, the protruding portion is now fixed with regard to the fixation end portion. In addition, at the fixation end portion, the carpet material is folded back rearward and downward, and is thus in the form of double layers, thereby allowing the rigid plate to be sandwiched between the two layers of the carpet material.

PRIOR ART DOCUMENTS

Patent Documents

Patent document 1: JP-A-2013-209002

SUMMARY OF THE INVENTION

Problems to be Solved by the Invention

As described above, since the bridging carpet of Patent document 1 needs to be folded back so as to form double layers and perform stitching later, there has been a problem of requiring many production steps. Further, there has also been a problem that since the carpet material is to be folded back so as to form double layers, a larger amount of the carpet material is required. These problems have contributed to a rise in production cost.

Further, since the bridging carpet disclosed in Patent document 1 is formed of a carpet material, the bended state of the intermediate portion of the fold portion can be maintained by stitching. However, for example, in a case where a member to be bridged between a seat back and a luggage platform is formed of a plastic resin such as an olefin-based thermoplastic elastomer (TPO), as a result of performing stitching to maintain a bended state of an intermediate portion, a stitched part(s) will easily deteriorate with time; and as deterioration progresses, it is also not favorable in terms of appearance and design property. Moreover, when the member is formed of a plastic resin such as TPO, there is a problem that if the member is used with no crease made thereon, it cannot be determined whether the member will be bended to be convex upward or downward after turning the seat back into a raised state; if the member is bended to be convex upward, there is a problem that a bended portion will protrude from a gap between the seat back and the luggage platform so as to partially occupy the space of the luggage platform or impair an appearance and design property.

Here, the present invention is to solve the above problems, and it is an object of the present invention to provide a connection member that has a simple structure and does not protrude upward from a gap between a first attachment receiving portion and a second attachment receiving portion when bended.

Means to Solve the Problems

A connection member of the present invention is to be bridged between a first attachment receiving portion and a second attachment receiving portion and is capable of stretching and contracting as at least one of the first attachment receiving portion and the second attachment receiving portion moves. The connection member includes: a main body portion formed into a shape of a thin plate or a sheet; a plurality of long convex portions provided on the main body portion in a parallel manner; and a bending portion having the plurality of the long convex portions. The long convex portions are extendedly provided in a direction orthogonal to a stretching and contracting direction of the connection member. As the first attachment receiving portion and the second attachment receiving portion approach each other, the bending portion is to be bended in a manner such that the plurality of the long convex portions are to be positioned inward.

Further, in the case of the connection member of the present invention, the plurality of the long convex portions are provided on a one side surface portion of the main body portion and on an other side surface portion of the main body portion that is opposite to the one side surface portion, and the plurality of the long convex portions provided on the one side surface portion are arranged in a location not opposing the plurality of the long convex portions provided on the other side surface portion.

Furthermore, in the case of the connection member of the present invention, the long convex portions are each formed into a shape of an isosceles trapezoidal pillar.

Furthermore, in the case of the connection member of the present invention, the long convex portions are extendedly provided over an entire width of the main body portion.

Furthermore, in the case of the connection member of the present invention, the main body portion and the long convex portions are integrally molded together using a flexible synthetic resin.

Furthermore, in the case of the connection member of the present invention, the bending portion having the plurality of the long convex portions is provided at one location on a one side surface portion of the main body portion.

Furthermore, in the case of the connection member of the present invention, one bending portion having the plurality of the long convex portions is provided in a manner such that the bending portion is arranged at one location on a one side surface portion of the main body portion, and two bending portions having the plurality of the long convex portions are provided in a manner such that the bending portions are arranged at two locations on an other side surface portion of the main body portion that is opposite to the one side surface portion.

Furthermore, in the case of the connection member of the present invention, the bending portions are alternately arranged on the one side surface portion and the other side surface portion from a one side end portion side of the main body portion toward an other side end portion side of the main body portion.

Furthermore, in the case of the connection member of the present invention, a given interval is present between adjacent bending portions.

Furthermore, in the case of the connection member of the present invention, the first attachment receiving portion is a seat back of a vehicle, and the second attachment receiving portion is a luggage room floor of the vehicle.

Furthermore, in the case of the connection member of the present invention, a one side end portion of the main body portion is to be fixed to the seat back, an other side end portion of the main body portion is to be fixed to an undersurface portion of the luggage room floor, and the one side end portion is to be positioned below an upper surface of the luggage room floor after raising the seat back.

Effects of the Invention

The present invention allows the connection member to be bended without protruding upward from the gap between the first attachment receiving portion and the second attachment receiving portion, as at least one of the first attachment receiving portion and the second attachment receiving portion moves.

MODE FOR CARRYING OUT THE INVENTION

Figure 1:
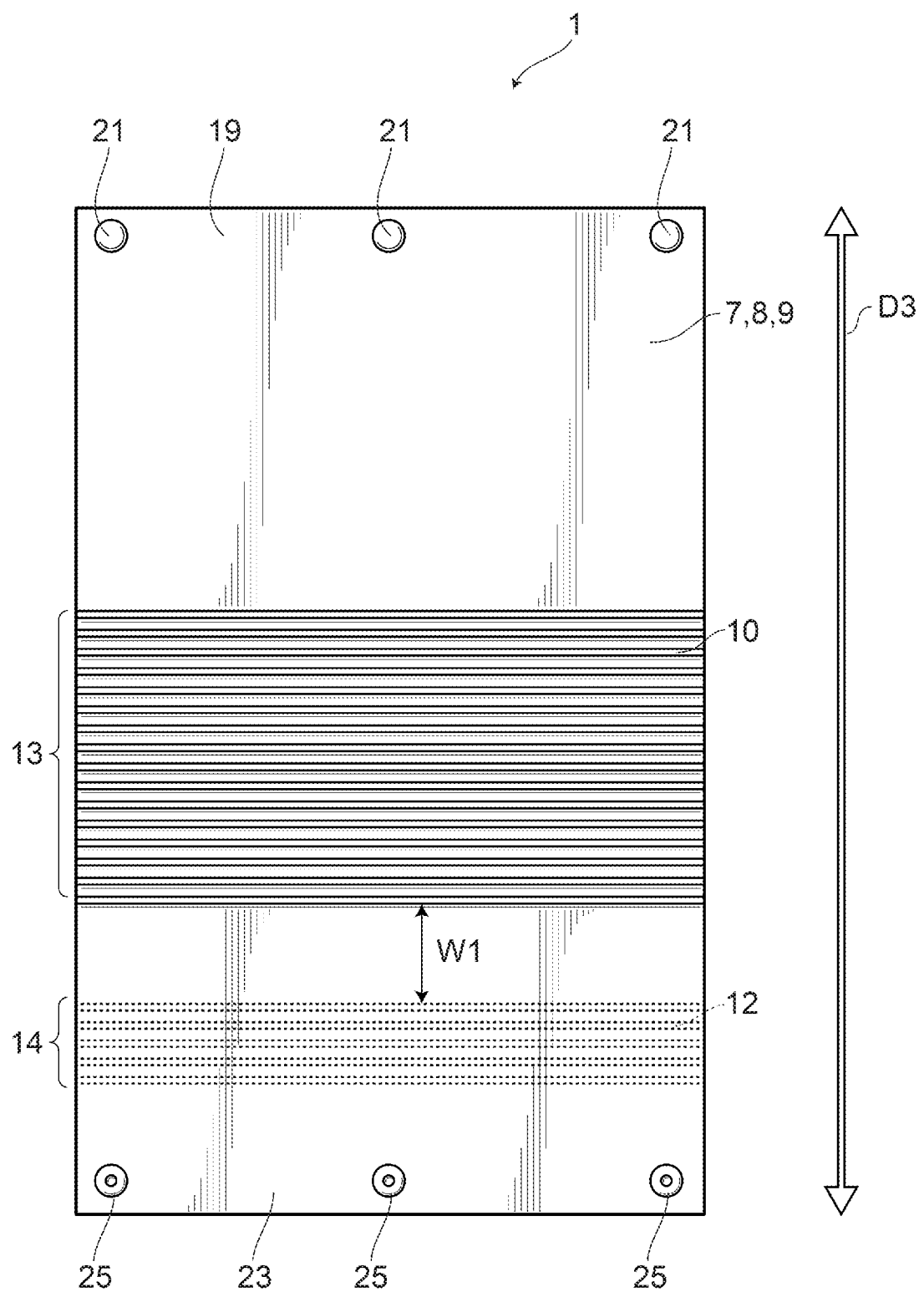
FIG. 1 is a front view showing a connection member of a first embodiment.

Embodiments of the present invention are described hereunder with reference to FIG. 1 to FIG. 12. The embodiments described below shall not limit the contents of the present invention that are written in the claims. Further, not all the structures described below are necessarily the essential elements of the present invention.

First Embodiment

A first embodiment of the present invention is shown in FIG. 1 to FIG. 10. A connection member 1 of this embodiment is to be detachably bridged between a rearmost seat 3 of a vehicle 2 and a luggage room floor 5 of a luggage room 4 provided behind the rearmost seat 3. A seat back 6 of the rearmost seat 3 can be raised and tilted (movable). In a raised state, the seat back 6 is used as a backrest by a passenger seated in the rearmost seat 3; in a forward-tilted state where the seat back 6 has been tilted forward, the seat back 6 shall be substantially flat with the luggage room floor 5 so that the seat back 6 can be used as a luggage floor. A gap T is provided between the rearmost seat 3 and the luggage room floor 5 for the purpose of preventing the rearmost seat 3 and the luggage room floor 5 from interfering with each other at the time of adjusting the position of the rearmost seat 3 in a front-rear direction and adjusting the angle of the seat back 6. The connection member 1 is installed to prevent an object(s) from falling into this gap T. In this embodiment, the seat back 6 corresponds to a first attachment receiving portion of the present invention, and the luggage room floor 5 corresponds to a second attachment receiving portion of the present invention.

Figure 2:
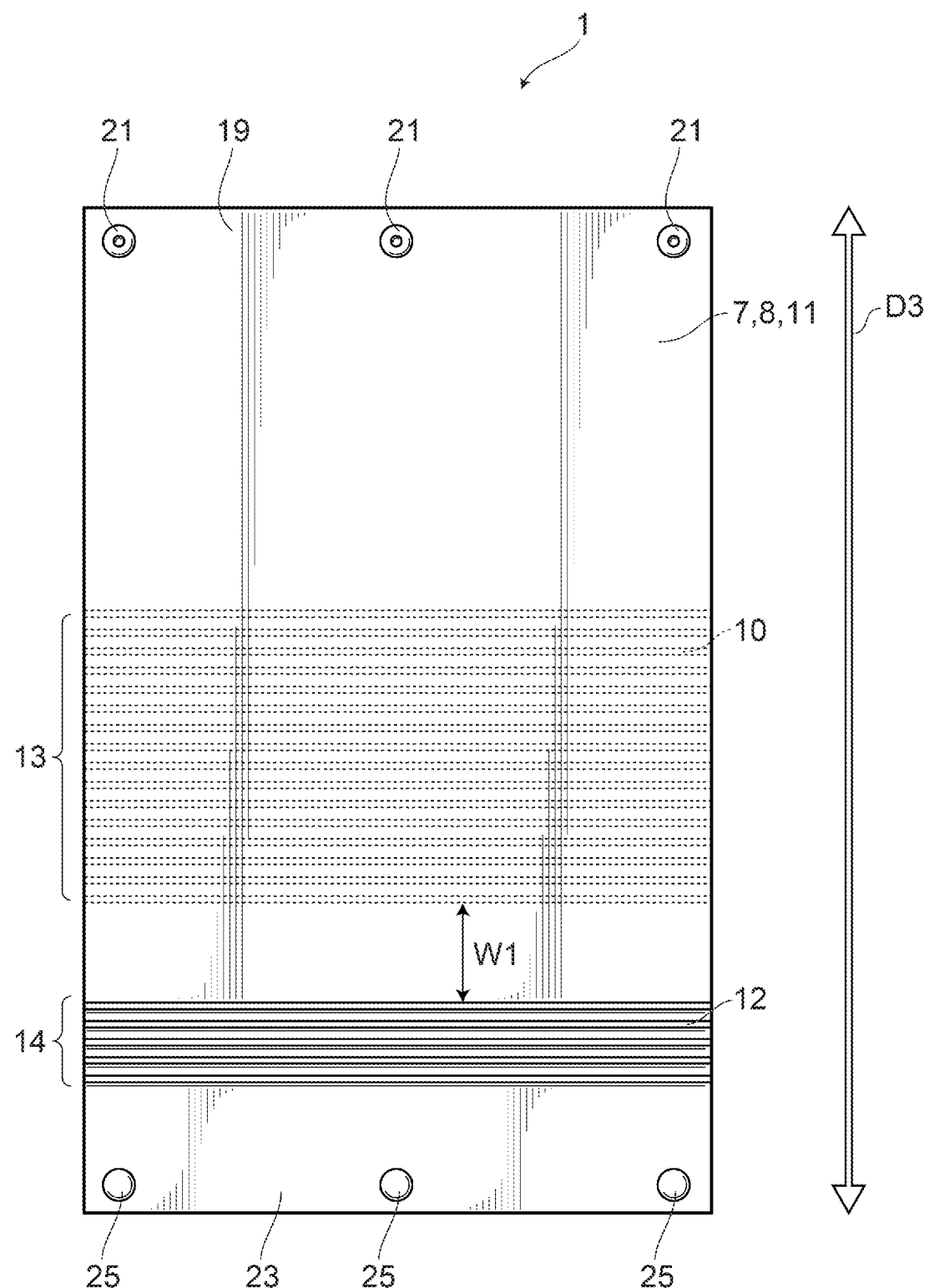
FIG. 2 is a back view showing the connection member of the first embodiment.

As shown in FIG. 1 and FIG. 2, the connection member 1 has a rectangular shape in a front view, and has a main body portion 7 formed into the shape of a thin plate or sheet having a thickness of about 2 mm, and 16 long convex portions 10 and 5 long convex portions 12 provided on a surface portion 8 of the main body portion 7. The long convex portions 10 are provided on a front surface 9 as one side surface portion of the main body portion 7; the long convex portions 12 are provided on a back surface 11 as the other side surface portion of the main body portion 7. That is, the long convex portions 10 and the long convex portions 12 are respectively provided on the opposing front surface 9 and back surface 11. The main body portion 7 and the long convex portions 10, 12 are integrally molded using an olefin-based thermoplastic elastomer (TPO) with an ethylene propylene rubber (EPDM) being finely dispersed in polypropylene (PP). Here, as a material for forming the connection member 1, there may be used other synthetic resins or the like as long as they possess similar levels of strength and flexibility as TPO. Further, the thickness of the main body portion 7 can be appropriately modified depending on a strength and bending amount thereof. Since the main body portion 7 of this embodiment has a uniform thickness overall, it also has a uniform strength overall. In the following descriptions, a portion of the connection member 1 where the long convex portions 10 are formed is referred to as a first bending portion 13, and a portion of the connection member 1 where the long convex portions 12 are formed is referred to as a second bending portion 14.

The long convex portions 10 are provided parallel to a bending top portion 15 where a maximum bending deformation amount of the first bending portion 13 will be observed. In other words, the long convex portions 10 are provided parallel to a direction (a direction projecting from and sinking into the plane of paper of FIG. 4) orthogonal to a bending direction D1 of the first bending portion 13 as indicated by an open arrow in FIG. 4. The long convex portions 10 are provided over the entire width of the main body portion 7 in a width direction thereof (lateral direction). Similarly, the long convex portions 12 are provided parallel to a bending top portion 16 where a maximum bending deformation amount of the second bending portion 14 will be observed. In other words, the long convex portions 12 are provided parallel to a direction (a direction projecting from and sinking into the plane of paper of FIG. 4) orthogonal to a bending direction D2 of the second bending portion 14 as indicated by an open arrow in FIG. 4. The long convex portions 12 are provided over the entire width of the main body portion 7 in the width direction thereof (lateral direction). More specifically, the long convex portions 10, 12 are extendedly provided parallel to a direction orthogonal to a later-described stretching and contracting direction D3 of the connection member 1. Here, although the long convex portions 10, 12 of this embodiment are provided over the entire width of the main body portion 7 in the width direction thereof, the long convex portions 10, 12 may be formed slightly shorter than the entire width of the main body portion 7 in the width direction thereof if there can be brought about an effect of limiting the bending direction(s) by a later-described tensile force and contraction force. Moreover, the lengths and sizes of the long convex portions 10, 12 may be different from one another.

When the connection member 1 is in a stretched state where the first bending portion 13 and the second bending portion 14 are not bended, the long convex portions 10 and the long convex portions 12 are arranged in a position where they shall not face each other. That is, the long convex portions 10 are not located on the opposite side (direct back side) of the long convex portions 12. In this embodiment, the first bending portion 13 and the second bending portion 14 do not overlap at all; a given interval W1 is present between the first bending portion 13 and the second bending portion 14. The length of the interval W1 is not fixed to a predetermined length, but may be determined by a position and range in which the first bending portion 13 and the second bending portion 14 are to be disposed. While there are provided 16 long convex portions 10 and 5 long convex portions 12 in this embodiment, the numbers of the long convex portions 10, 12 may be appropriately increased or decreased depending on, for example, the material, thickness and bending amount of the main body portion 7.

Since the first bending portion 13 is composed of the main body portion 7 and the long convex portions 10, the front surface 9 side has a concavo-convex shape, whereas the back surface 11 side has a flat shape. Since the second bending portion 14 is composed of the main body portion 7 and the long convex portions 12, the front surface 9 side has a flat shape, whereas the back surface 11 side has a concavo-convex shape.

Figure 3:
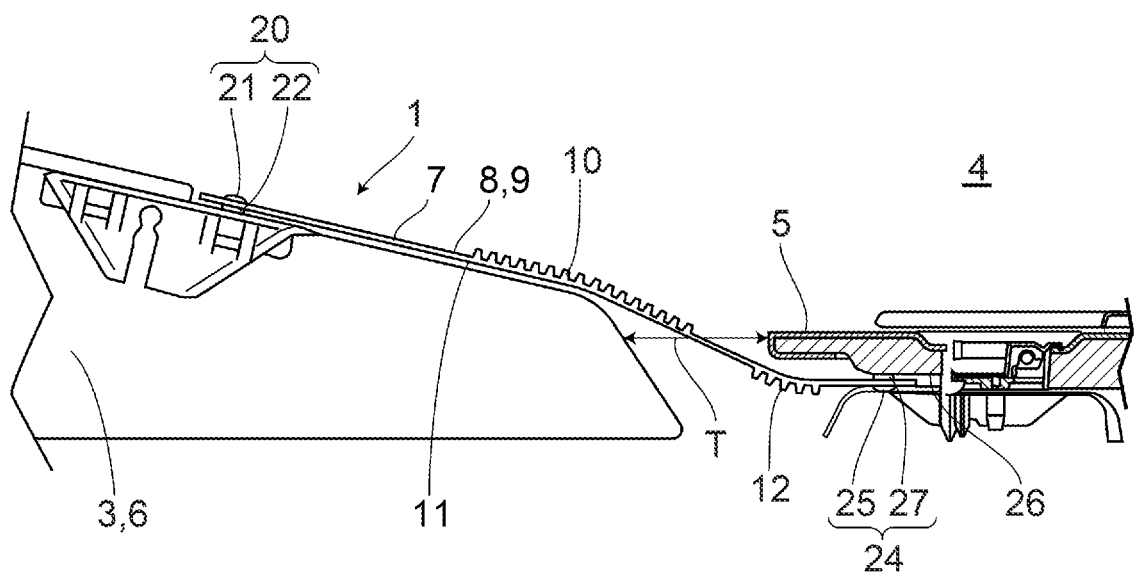
FIG. 3 is a left-side view showing the connection member of the first embodiment where a seat back is in a forward-tilted state.
Figure 4:
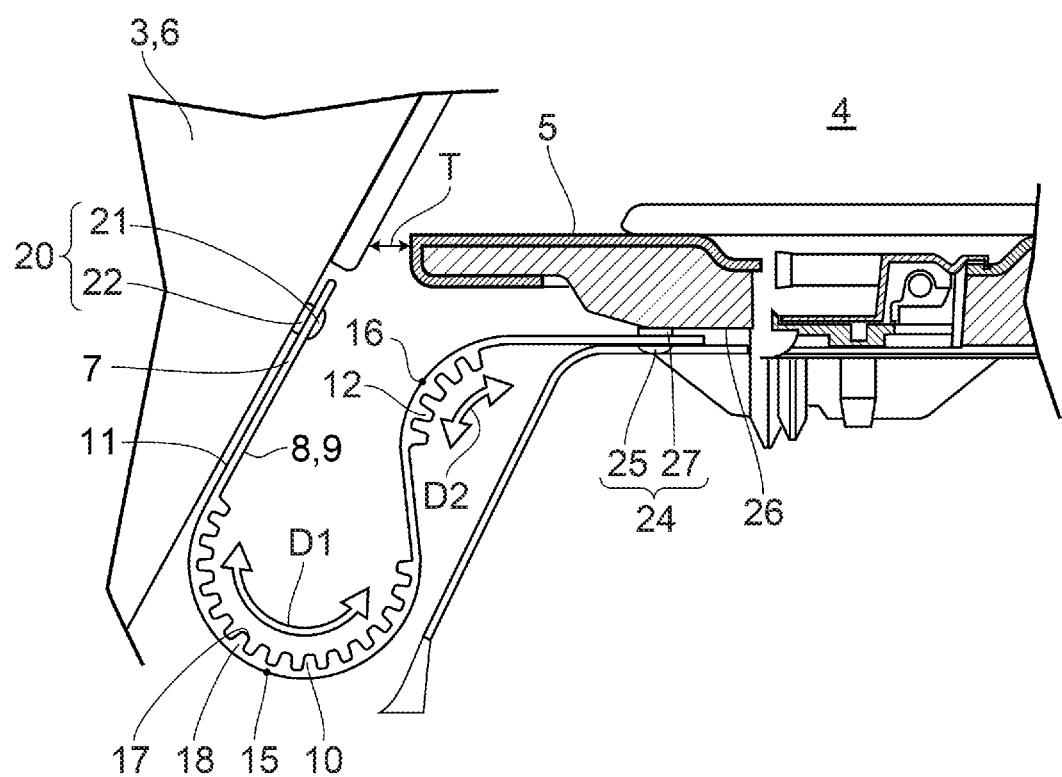
FIG. 4 is a left-side view showing the connection member of the first embodiment where the seat back is in a raised state.

As shown in FIG. 3 and FIG. 4, the long convex portions 10 are each formed into the shape of an isosceles trapezoid in a vertical cross-sectional view; since an upper edge portion 17 is formed shorter than a lower edge portion 18, when the first bending portion 13 has been bended with the long convex portions 10 being positioned inward, the adjacent long convex portions 10 themselves will not easily abut against each another. Further, the long convex portions 12 are each formed into a shape identical to that of the long convex portions 10; when the second bending portion 14 has been bended with the long convex portions 12 being positioned inward, the adjacent long convex portions 12 themselves will not easily abut against each other. Here, in this embodiment, the outer shape of each of the long convex portions 10, 12 is that of an isosceles trapezoidal pillar, and the long convex portions 10, 12 are each formed into the shape of an isosceles trapezoid in a vertical cross-sectional view; the long convex portions 10, 12 may each be formed into a different shape in a vertical cross-sectional view, such as a semicircular shape and a triangular shape if the adjacent long convex portions 10 themselves as well as the adjacent long convex portions 12 themselves will not easily abut against each other when the first bending portion 13 and the second bending portion 14 have been bended, and if there can be brought about an effect of limiting the bending direction(s) by a later-described tensile force and contraction force.

When bending the first bending portion 13 and the second bending portion 14, a tensile force will act on an outer side part of a curve, and a contraction force will act on an inner side part of the curve. While the main body portion 7 and the long convex portions 10, 12 in this embodiment are integrally formed by an identical material, TOP, the long convex portions 10, 12 are formed thicker than the main body portion 7. Therefore, the long convex portions 10, 12 have mold shrinkage ratios larger than that of the main body portion 7, and densities higher than that of the main body portion 7. Thus, at the first bending portion 13 and the second bending portion 14, the tensile force and contraction force required to bend the long convex portions 10, 12 outward are larger than the tensile force and contraction force required to bend the long convex portions 10, 12 inward. That is, at the first bending portion 13 and the second bending portion 14, it is easier to bend the long convex portions 10, 12 inward rather than outward. In this way, by employing the long convex portions 10, 12, the bending directions of the first bending portion 13 and the second bending portion 14 can be limited. If there are a need to widen the range by which the connection member 1 is to be bended, and a need to increase the curvature, the number of the long convex portions 10, 12 may simply be increased. In contrast, if there are a need to narrow the range by which the connection member 1 is to be bended, and a need to decrease the curvature, the number of the long convex portions 10, 12 may simply be reduced. In this embodiment, since the bending range as well as curvature of the first bending portion 13 need to be larger than those of the second bending portion 14, the number of the long convex portions 10 at the first bending portion 13 is larger than the number of the long convex portions 12 at the second bending portion 14.

Provided at three locations on a front side end portion 19 as one side end portion of the main body portion 7 are female button portions 21 of snap buttons 20 as fixation tools for fixing the connection member 1 to the rearmost seat 3. The front side end portion 19 of the connection member 1 can be fixed to the rearmost seat 3 by allowing these female button portions 21 to engage with male button portions 22 of the snap buttons 20 provided on the seat back 6 of the rearmost seat 3. Further, provided at three locations on a rear side end portion 23 as the other side end portion of the main body portion 7 are female button portions 25 of snap buttons 24 as fixation tools for fixing the connection member 1 to the luggage room floor 5. The rear side end portion 23 of the connection member 1 can be fixed to the luggage room floor 5 by allowing these female button portions 25 to engage with male button portions 27 of the snap buttons 24 provided on an undersurface portion 26 of the luggage room floor 5. Since the connection member 1 is to be fixed by the snap buttons 20, 24, it is detachable with regard to the rearmost seat 3 and the luggage room floor 5. In this embodiment, although the male button portions 22 of the snap buttons 20 are provided on the seat back 6 in a way such that the male button portions 22 are positioned below the upper surface of the luggage room floor 5 when the seat back 6 is in the raised state, the locations for installing the male button portions 22 may be appropriately changed.

Figure 5:
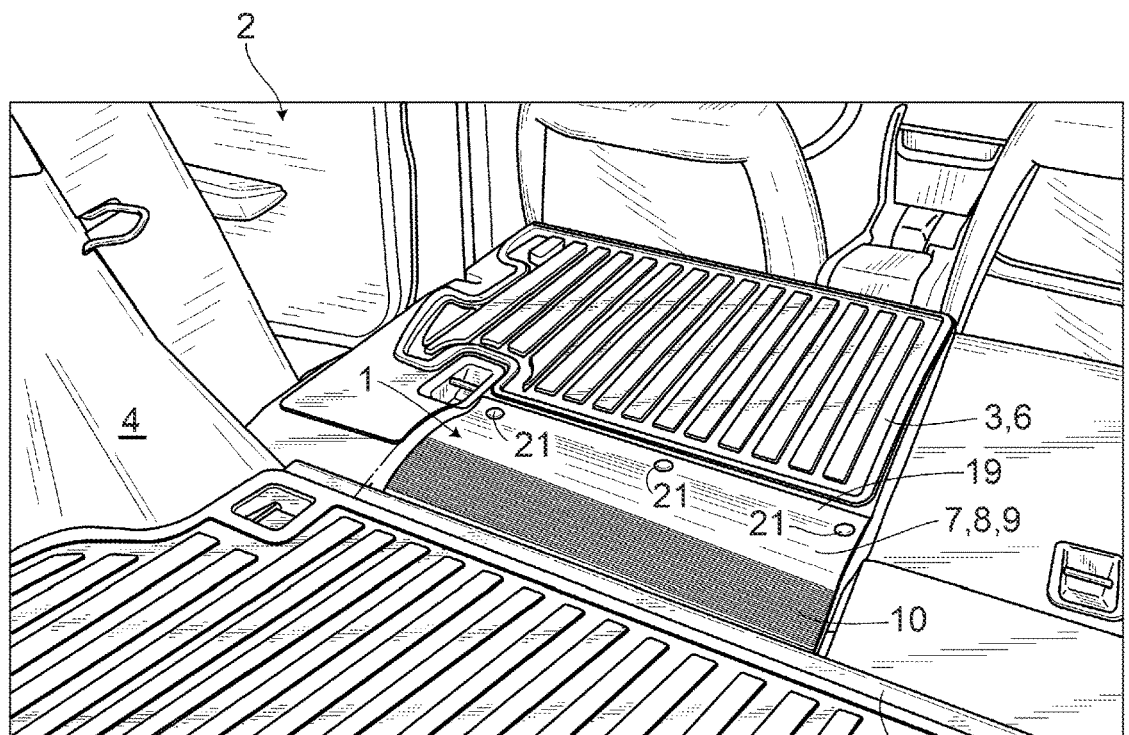
FIG. 5 is a perspective view showing a luggage room in the first embodiment where the seat back is in the forward-tilted state.
Figure 6:
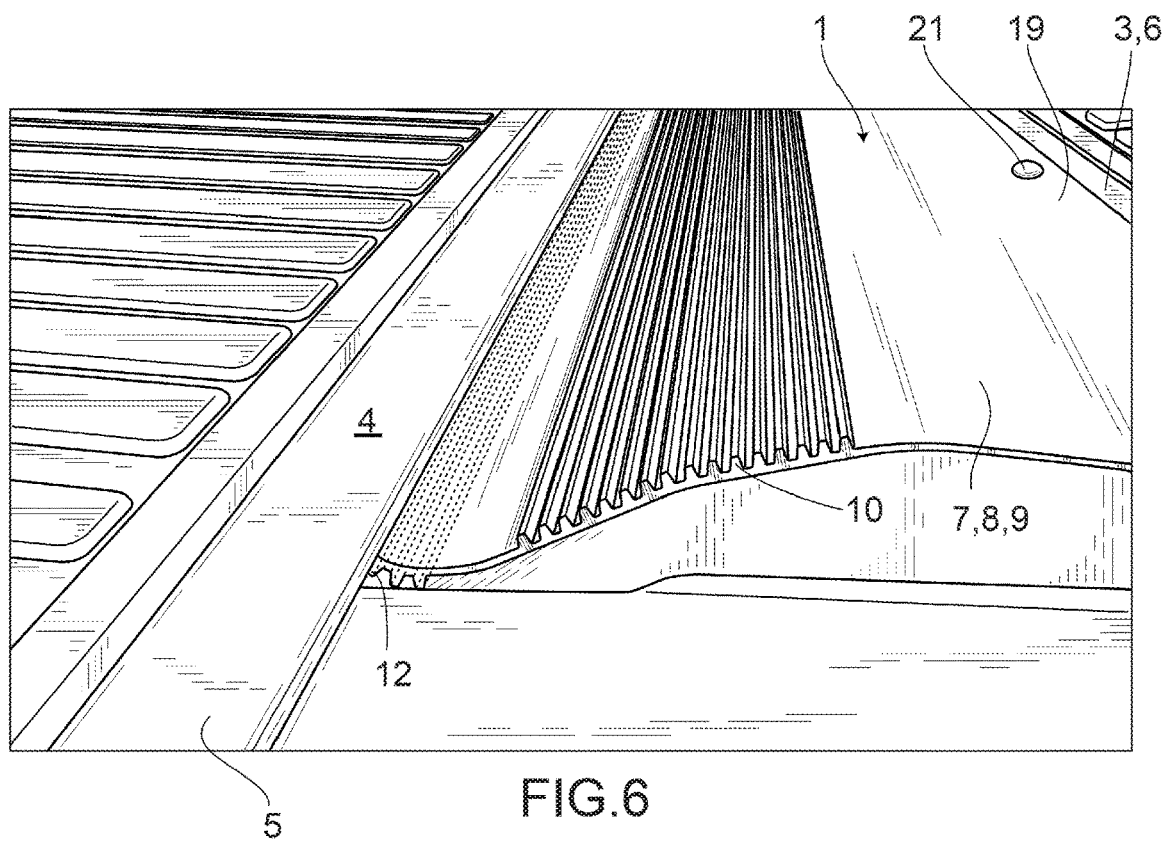
FIG. 6 is a perspective view showing the luggage room in the first embodiment where the seat back has been slightly raised from the forward-tilted state.
Figure 7:
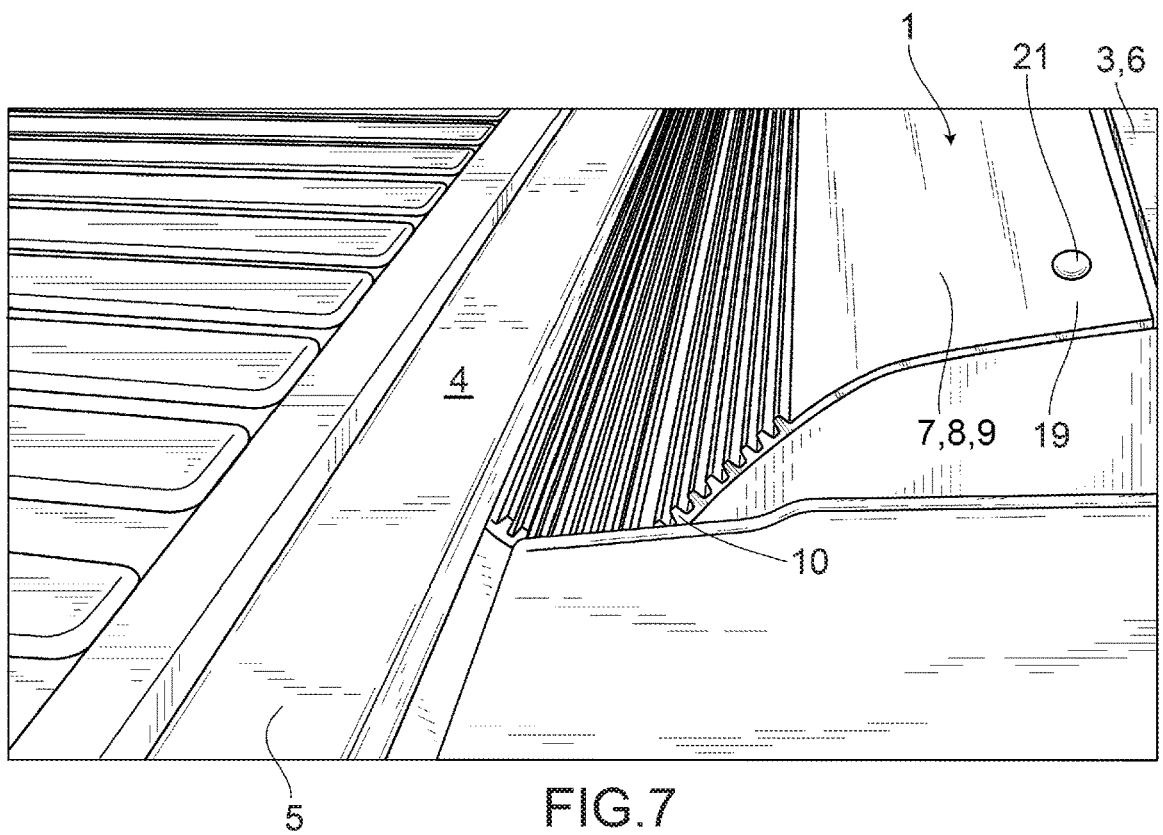
FIG. 7 is a perspective view showing the luggage room where the seat back has been slightly raised from the state shown in FIG. 6.
Figure 8:
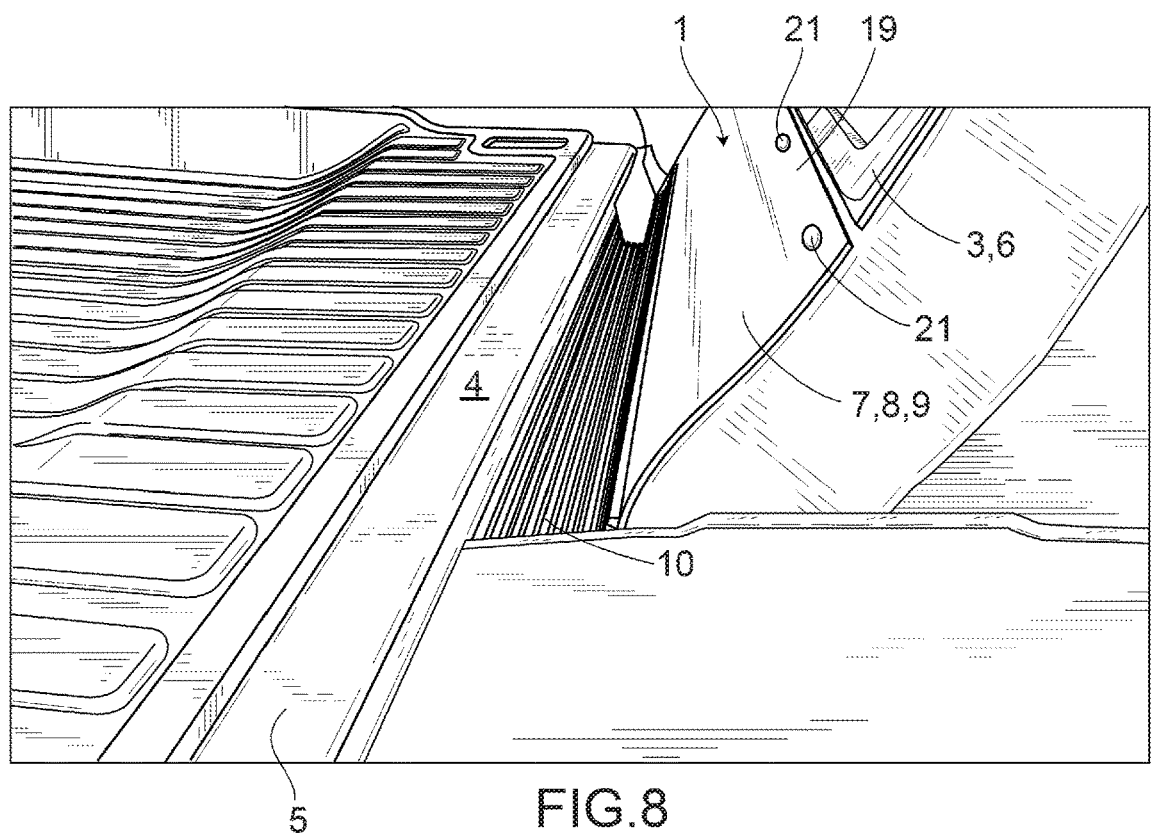
FIG. 8 is a perspective view showing the luggage room where the seat back has been slightly raised from the state shown in FIG. 7.
Figure 9:
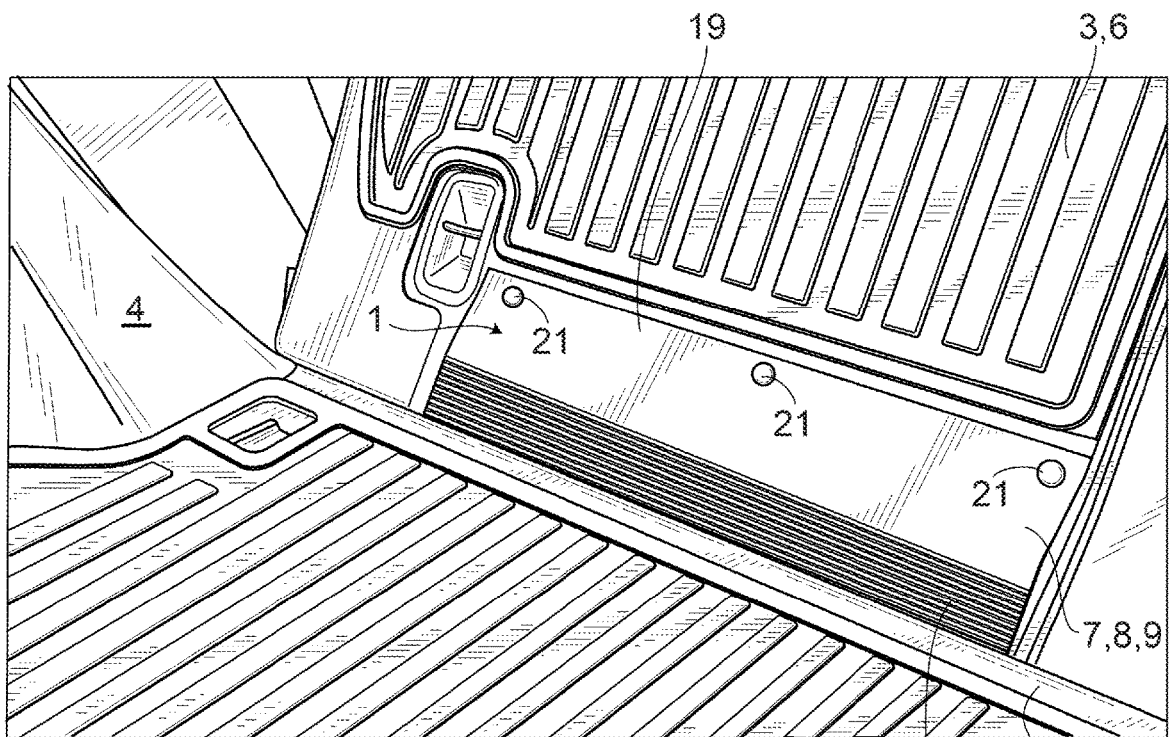
FIG. 9 is a perspective view showing the luggage room where the seat back has been slightly raised from the state shown in FIG. 8.
Figure 10:
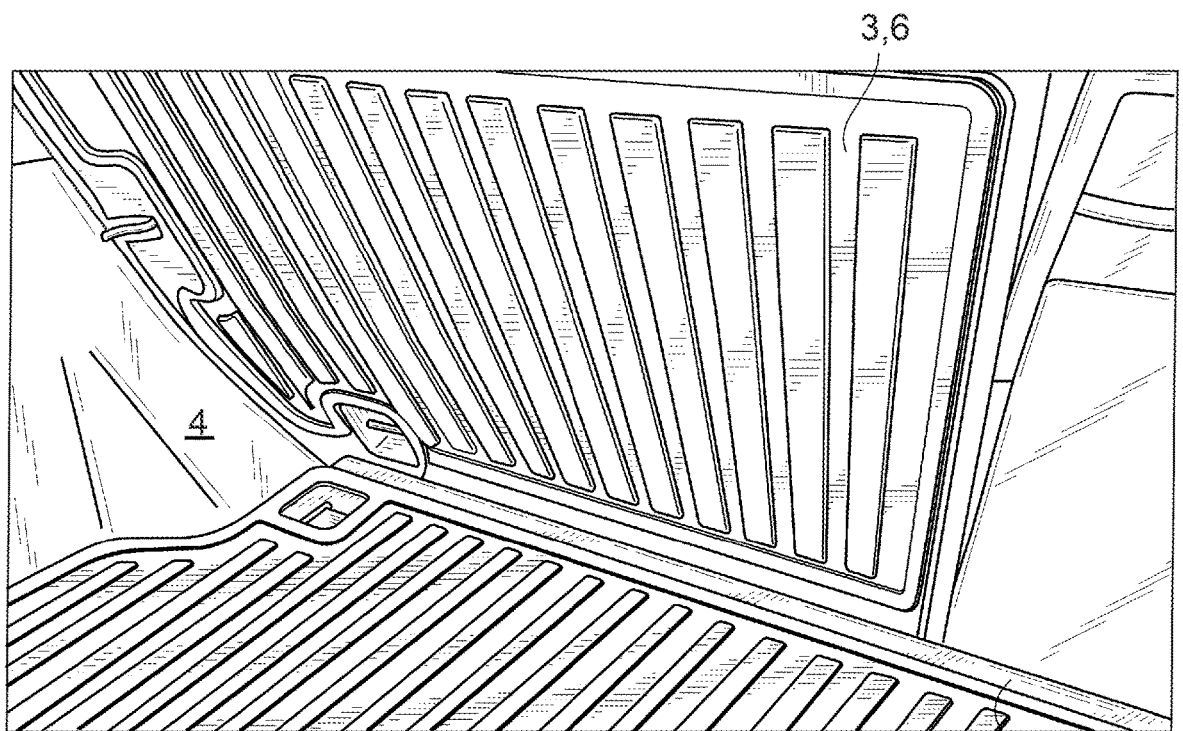
FIG. 10 is a left-side view showing the luggage room in the first embodiment where the seat back is in the raised state.

Here, deformation of the connection member 1 when raising and tilting the seat back 6 of the rearmost seat 3 is described. As shown in FIG. 3 and FIG. 5, in the state where the seat back 6 has been tilted forward, the connection member 1 is in the stretched state though the first bending portion 13 and the second bending portion 14 are slightly bended. Next, as shown in order of FIG. 6, FIG. 7, FIG. 8 and FIG. 9, when gradually raising the seat back 6, the first bending portion 13 will be bended so that the long convex portions 10 will be positioned inward, and the second bending portion 14 will be bended so that the long convex portions 12 will be positioned inward. Further, as shown in FIG. 4 and FIG. 10, in a state where the seat back 6 has been completely raised, the connection member 1 is received between the rearmost seat 3 and the luggage room floor 5 in a bended manner without protruding upward from the gap T between the rearmost seat 3 and the luggage room floor 5. In this embodiment, since the bending portion(s) are provided at two locations (first bending portion 13 and second bending portion 14), the connection member 1 is to be bended into the shape of "S" in a side view.

In this way, when turning the seat back 6 from the forward-tilted state to the raised state, the seat back 6 will move to approach the luggage room floor 5 such that the front side end portion 19 of the connection member 1 will approach the rear side end portion 23 in an arc orbit. At that time, a force bending the connection member 1 will act on the connection member 1. As described above, as for the first bending portion 13 and the second bending portion 14, the long convex portions 10, 12 are easier to be bended inward rather than outward. Therefore, after turning the seat back 6 from the forward-tilted state to the raised state, the connection member 1, while remaining bended, will be received in a lower region between the rearmost seat 3 and the luggage room floor 5. When turning the seat back 6 from the raised state to the forward-tilted state, since the seat back 6 will move away from the luggage room floor 5, a stretching force will act on the bended connection member 1; after the seat back 6 has been turned into the forward-tilted state, the connection member 1 will be in the stretched state. Thus, a direction indicated by an open arrow D3 in FIG. 1 and FIG. 2 is the direction along which the connection member 1 stretches and contracts.

As described above, the connection member 1 of this embodiment is to be bridged between the seat back 6 and the luggage room floor 5, and stretches and contracts as at least one of the seat back 6 and the luggage room floor 5 moves. The connection member 1 has the main body portion 7 formed into the shape of a thin plate or a sheet; and a plurality of the long convex portions 10, 12 provided on the main body portion 7 in a parallel manner. The long convex portions 10, 12 are extendedly provided in a direction orthogonal to the direction D3 along which the connection member 1 stretches and contracts. As the seat back 6 and the luggage room floor 5 approach each other, the first bending portion 13 and second bending portion 14 having the plurality of the long convex portions 10, 12 will be bended in a manner such that the plurality of the long convex portions 10, 12 will be positioned inward, thereby allowing the connection member 1 to be received between the rearmost seat 3 and the luggage room floor 5 when the seat back 6 has been turned into the raised state without having the connection member 1 protruding upward from the gap T between the rearmost seat 3 and the luggage room floor 5.

Further, in the case of the connection member 1 of this embodiment, the plurality of the long convex portions 10, 12 are respectively provided on the front surface 9 of the main body portion 7 and the back surface 11 of the main body portion 7 that is opposite to the front surface 9. Since the plurality of the long convex portions 10 provided on the front surface 9 are arranged in a location not opposing the plurality of the long convex portions 12 provided on the back surface 11, the connection member 1 can be contracted into the shape of "S" in a side view by bending the first bending portion 13 and the second bending portion 14 in a way such that the plurality of the long convex portions 10, 12 will be positioned inward.

Further, in the case of the connection member 1 of this embodiment, since the long convex portions 10, 12 are each formed into the shape of an isosceles trapezoidal pillar, the adjacent long convex portions 10 will not easily abut against each other after bending the first bending portion 13 so that the plurality of the long convex portions 10 will be positioned inward. Thus, the curvature of the curve of the first bending portion 13 can be increased. In addition, the adjacent long convex portions 12 will not easily abut against each other after bending the second bending portion 14 so that the plurality of the long convex portions 12 will be positioned inward. Thus, the curvature of the curve of the second bending portion 14 can be increased.

Further, in the case of the connection member 1 of this embodiment, since the long convex portions 10, 12 are extendedly provided over the entire width of the main body portion 7, the first bending portion 13 and the second bending portion 14 can be easily bended over the entire width of the main body portion 7 in a way such that the long convex portions 10, 12 will be positioned inward.

Further, in the case of the connection member 1 of this embodiment, since the main body portion 7 and the long convex portions 10, 12 are integrally molded together using a flexible synthetic resin, the main body portion 7 and the long convex portions 10, 12 having large mold shrinkage ratios and high densities can be produced by performing molding once. Thus, the production process thereof is simple, and the production cost thereof can be inexpensive.

Further, in the case of the connection member 1 of this embodiment, since the first bending portion 13 and the second bending portion 14 are alternately arranged on the front surface 9 and the back surface 11 from the front side end portion 19 side of the main body portion 7 toward the rear side end portion 23 side thereof, the connection member 1 can be bended and contracted into the shape of "S" as a whole in a side view by bending the first bending portion 13 and the second bending portion 14 so that the plurality of the long convex portions 10, 12 will be positioned inward.

Further, in the case of the connection member 1 of this embodiment, since the given interval W1 is present between the adjacent first bending portion 13 and second bending portion 14, when bending the first bending portion 13 and the second bending portion 14, they are less likely to interfere with each other and can each be evenly bended. The larger the interval W1 is, the less likely that the first bending portion 13 and the second bending portion 14 will interfere with each other.

Further, in the case of the connection member 1 of this embodiment, since the first attachment receiving portion is the seat back 6 of the vehicle 2, and the second attachment receiving portion is the luggage room floor 5 of the vehicle 2, the connection member 1 can be stretched and contracted by raising and tilting the seat back 6. Moreover, when the connection member 1 has contracted, the first bending portion 13 and the second bending portion 14 of the connection member 1 can be bended so that the plurality of the long convex portions 10, 12 will be positioned inward. In this way, the connection member 1 can be received between the rearmost seat 3 and the luggage room floor 5 when the seat back 6 is in the raised state, and prevented from protruding upward from the gap T between the rearmost seat 3 and the luggage room floor 5.

Further, in the case of the connection member 1 of this embodiment, the front side end portion 19 of the main body portion 7 is to be fixed to the seat back 6, the rear side end portion 23 of the main body portion 7 is to be fixed to the undersurface portion 26 of the luggage room floor 5, and the front side end portion 19 will be positioned below the upper surface of the luggage room floor 5 after raising the seat back 6. Thus, when the seat back 6 is in the raised state, the whole connection member 1 is received at a position that is located between the rearmost seat 3 and the luggage room floor 5 and is below the upper surface of the luggage room floor 5, thereby making it difficult for the connection member 1 to be visually recognized from the luggage room 4 side.

Second Embodiment

Figure 11:
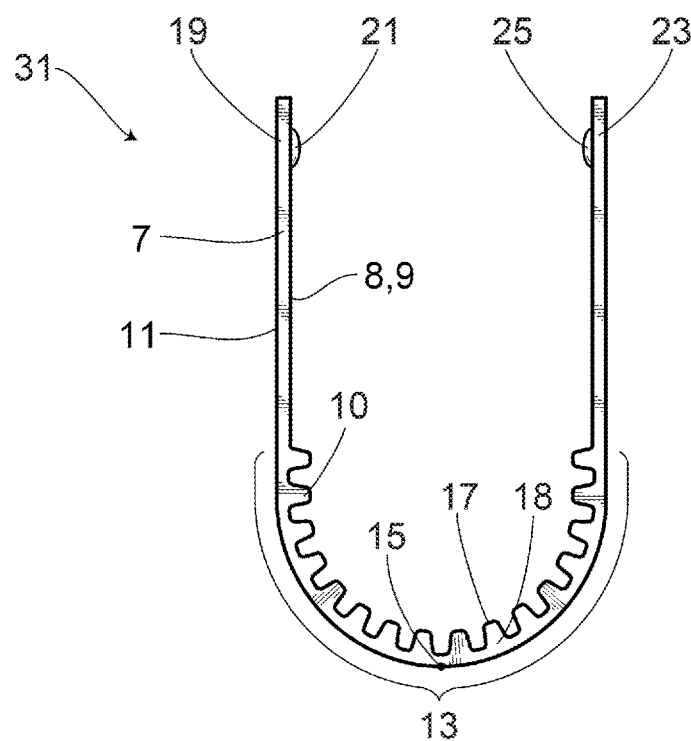
FIG. 11 is a left-side view showing a connection member of a second embodiment.

A second embodiment of the present invention is shown in FIG. 11. Elements identical to those of the first embodiment are given identical symbols; the second embodiment is described in detail hereunder while the detailed descriptions of those elements are omitted. In this embodiment, the long convex portions 12 of the first embodiment are not provided.

FIG. 11 shows a state where a connection member 31 of this embodiment has been bended. Since the connection member 31 of this embodiment has one bending portion which is the first bending portion 13 having the long convex portions 10, the connection member 31 will be turned into the shape of "U" in a side view as a result of bending the first bending portion 13. Thus, it is preferred that the connection member 31 be used when it is to be purposefully bended into the shape of "U."

In the case of the connection member 31 of this embodiment, by applying an external force for bending the connection member 31, the connection member 31 will be bended in an intended direction at the first bending portion 13 i.e. in a manner such that the plurality of the long convex portions 10 will be positioned inward, thereby allowing the connection member 31 as a whole to be contracted. Further, by eliminating the external force applied, the connection member 31 can be stretched by a restoring force thereof.

As described above, in the case of the connection member 31 of this embodiment, since the first bending portion 13 having the plurality of the long convex portions 10 is provided at one location on the front surface 9 of the main body portion 7, by bending the first bending portion 13 in a way such that the plurality of the long convex portions 10 will be positioned inward, the connection member 31 as a whole can be bended and contracted into the shape of "U" in a side view.

Third Embodiment

Figure 12:
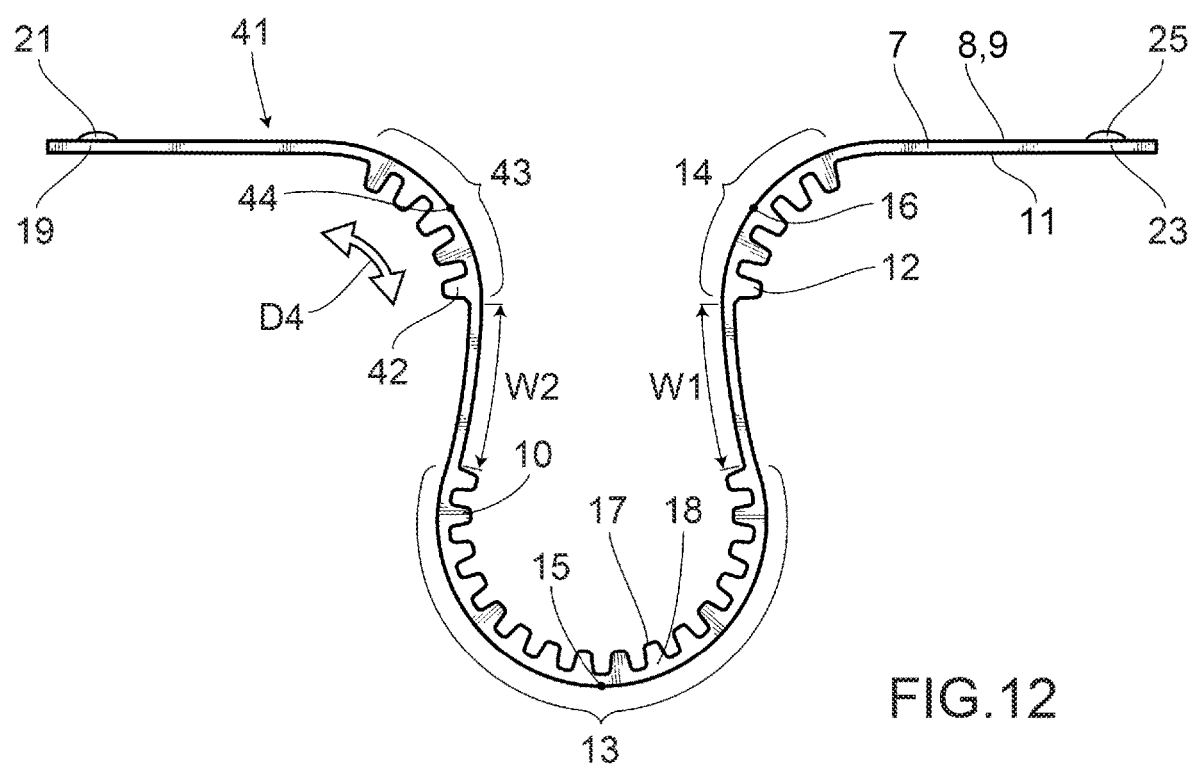
FIG. 12 is a left-side view showing a connection member of a third embodiment.

A third embodiment of the present invention is shown in FIG. 12. Elements identical to those of the first embodiment are given identical symbols; the third embodiment is described in detail hereunder while the detailed descriptions of those elements are omitted. A connection member 41 of this embodiment is such that five long convex portions 42 are provided in addition to the long convex portions 10, 12. In the following descriptions, in the connection member 41, a portion where the long convex portions 42 are formed is referred to as a third bending portion 43.

FIG. 12 shows a state where the connection member 41 of this embodiment has been bended. In the case of the connection member 41 of this embodiment, the five long convex portions 42 are provided on the back surface 11 of the main body portion 7. The long convex portions 42 are each formed into a shape identical to that of the long convex portions 10, 12, and are extendedly provided parallel to the long convex portions 10, 12. That is, the long convex portions 42 are provided parallel to a bending top portion 44 where a maximum bending deformation amount of the third bending portion 43 will be observed. In other words, the long convex portions 42 are provided parallel to a direction (a direction projecting from and sinking into the plane of paper of FIG. 12) orthogonal to a bending direction D4 of the third bending portion 43 as indicated by an open arrow in FIG. 12. The long convex portions 42 are provided over the entire width of the main body portion 7 in the width direction thereof (lateral direction). Here, although the long convex portions 10, 12, 42 of this embodiment are each formed into an identical shape, the lengths and sizes thereof may be different from one another.

In this embodiment, the bending portions are provided from the front side end portion 19 side toward the rear side end portion 23 in an order of the third bending portion 43, the first bending portion 13 and the second bending portion 14. A given interval W2 is present between the first bending portion 13 and the third bending portion 43. Thus, the long convex portions 10 and the long convex portions 42 are arranged in locations not opposing each other. That is, the long convex portions 10 are not located on the opposite side (direct back side) of the long convex portions 42. In this embodiment, the first bending portion 13 and the third bending portion 43 do not overlap at all. While there are provided five long convex portions 42 in this embodiment, the number of the long convex portions 42 may be appropriately increased or decreased depending on, for example, the material, thickness and bending amount of the main body portion 7.

In this embodiment, since the bending portion(s) are provided at three locations, an inverted "Ω" shape will be established in a side view by bending the first bending portion 13, the second bending portion 14 and the third bending portion 43. Thus, it is preferred that the connection member 41 be used when it is to be purposefully bended into the shape of inverted "Ω".

In the case of the connection member 41 of this embodiment, by applying an external force for bending the connection member 41, the connection member 41 will be bended in an intended direction(s) at the first bending portion 13, the second bending portion 14 and the third bending portion 43 i.e. in a manner such that the plurality of the long convex portions 10, 12, 42 will be positioned inward, thereby allowing the connection member 41 as a whole to be contracted. Further, by eliminating the external force applied, the connection member 41 can be stretched by a restoring force thereof.

As described above, in the case of the connection member 41 of this embodiment, the first bending portion 13, second bending portion 14 and third bending portion 43 having the plurality of the long convex portions 10, 12, 42 are provided in a manner such that the bending portion 13 is arranged at one location on the front surface 9 of the main body portion 7, and the bending portions 14 and 43 are arranged at two locations on the back surface 11 of the main body portion 7 that is opposite to the front surface 9. Thus, by bending the first bending portion 13, the second bending portion 14 and the third bending portion 43 in a way such that the plurality of the long convex portions 10, 12, 42 will be positioned inward, the connection member 41 as a whole can be bended and contracted into the shape of inverted "Ω" in a side view.

Fourth Embodiment

Figure 13:
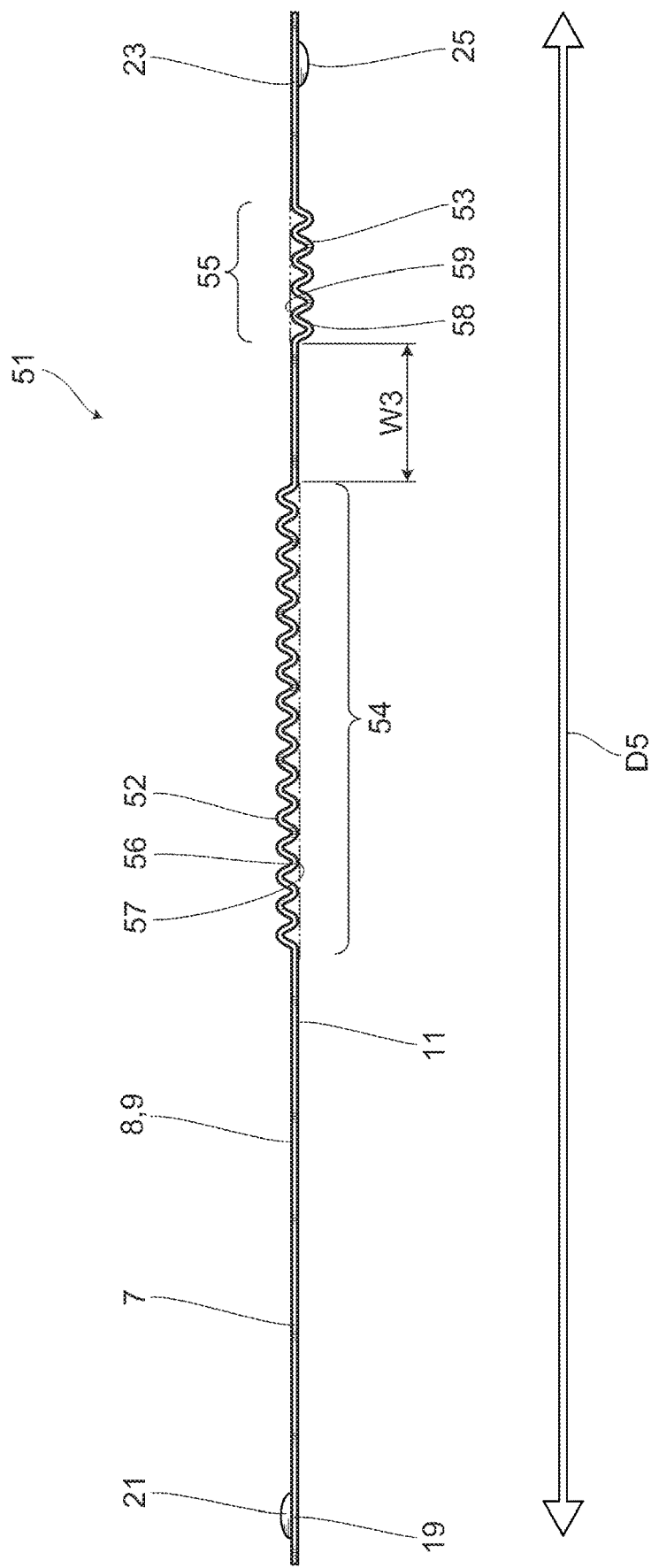
FIG. 13 is a left-side view showing a connection member of a fourth embodiment.

A fourth embodiment of the present invention is shown in FIG. 13. Elements identical to those of the first embodiment are given identical symbols; the fourth embodiment is described in detail hereunder while the detailed descriptions of those elements are omitted. A connection member 51 of this embodiment is such that part(s) of the main body portion 7 are formed into a wavy shape so as to form long convex portions 52, 53.

In this embodiment, 16 long convex portions 52 are formed on and protrude from the front surface 9 side as one side surface portion of the main body portion 7, and 5 long convex portions 53 are formed on and protrude from the back surface 11 side as the other side surface portion of the main body portion 7. In the following descriptions, in the connection member 51, a portion where the long convex portions 52 are formed is referred to as a fourth bending portion 54, and a portion where the long convex portions 53 are formed is referred to as a fifth bending portion 55.

As is the case with the connection member 1 of the first embodiment, the long convex portions 52, 53 are extendedly provided parallel to a direction orthogonal to a direction D5 along which the connection member 51 stretches and contracts. Further, as for the thickness of the main body portion 7, the portions where the fourth bending portion 54 and the fifth bending portion 55 are provided are formed into a thickness identical to that of portions where these bending portions are not provided; the main body portion 7 has a uniform strength overall. In addition, the long convex portions 52, 53 of this embodiment are provided over the entire width of the main body portion 7 in the width direction thereof. Here, the length and size of each of the long convex portions 52, 53 may be different from one another.

As are the cases with the long convex portions 10 and the long convex portions 12 of the first embodiment, the long convex portions 52 and the long convex portions 53 are arranged in locations not opposing each other when the connection member 51 is in a stretched state. In this embodiment, the fourth bending portion 54 and the fifth bending portion 55 do not overlap at all; a given interval W3 is present between the fourth bending portion 54 and the fifth bending portion 55. The length of the interval W3 is not fixed to a predetermined length, but may be determined by positions and ranges in which the fourth bending portion 54 and the fifth bending portion 55 are to be disposed. While there are provided 16 long convex portions 52 and 5 long convex portions 53 in this embodiment, the numbers of the long convex portions 52, 53 may be appropriately increased or decreased depending on, for example, the material, thickness and bending amount of the main body portion 7.

Formed between the adjacent long convex portions 52 are long concave portions 56 being convex toward the back surface 11 side. Concave bottom portions 57 of the long concave portions 56 are positioned on a plane (indicated by a dash-dot-dash line shown in FIG. 13) identical to a plane of the back surface 11 of the main body portion 7 where the fourth bending portion 54 and the fifth bending portion 55 are not formed. That is, the long concave portions 56 do not protrude beyond the back surface 11 of the main body portion 7 where the fourth bending portion 54 and the fifth bending portion 55 are not formed.

Formed between the adjacent long convex portions 53 are long concave portions 58 being convex toward the front surface 9 side. Concave bottom portions 59 of the long concave portions 58 are positioned on a plane (indicated by a dash-dot-dot-dash line shown in FIG. 13) identical to a plane of the front surface 9 of the main body portion 7 where the fourth bending portion 54 and the fifth bending portion 55 are not formed. That is, the long concave portions 58 do not protrude beyond the front surface 9 of the main body portion 7 where the fourth bending portion 54 and the fifth bending portion 55 are not formed.

As is the case with the connection member 1 of the first embodiment, the connection member 51 of this embodiment is to be bridged and attached between the seat back 6 and the luggage room floor 5; the fourth bending portion 54 and the fifth bending portion 55 will be bended as well as stretched and contracted by raising and tilting the seat back 6. At that time, the fourth bending portion 54 and the fifth bending portion 55 will be bended so that the long convex portions 52 and the long convex portions 53 will be positioned inward.

As described above, the connection member 51 of this embodiment is to be bridged between the seat back 6 and the luggage room floor 5, and stretches and contracts as at least one of the seat back 6 and the luggage room floor 5 moves. The connection member 51 has the main body portion 7 formed into the shape of a thin plate or a sheet; and a plurality of the long convex portions 52, 53 provided on the main body portion 7 in a parallel manner. The long convex portions 52, 53 are extendedly provided in a direction orthogonal to the direction D5 along which the connection member 51 stretches and contracts. As the seat back 6 and the luggage room floor 5 approach each other, the fourth bending portion 54 and fifth bending portion 55 having a plurality of the long convex portions 52, 53 will be bended in a manner such that the plurality of the long convex portions 52, 53 will be positioned inward, thereby allowing the connection member 51 to be received between the rearmost seat 3 and the luggage room floor 5 when the seat back 6 has been turned into the raised state without having the connection member 51 protruding upward from the gap T between the rearmost seat 3 and the luggage room floor 5.

Here, the present invention is not limited to the above-mentioned embodiments; various modifications are available within the scope of the gist of the present invention. For example, the bending portion may be provided at four locations or more; in such case, the bending portions shall be alternately arranged on the front surface 9 and the back surface 11 of the main body portion 7 from the front side end portion 19 side toward the rear side end portion 23 side. Further, as the fixation tool(s), there may be employed other tools such as a hook and loop fastener(s), as long as the tools employed are capable of detachably fixing the connection members 1, 31, 41 and 51.

The invention claimed is:

1. A connection member that is to be bridged between a first attachment receiving portion and a second attachment receiving portion and is capable of stretching and contracting as at least one of the first attachment receiving portion and the second attachment receiving portion moves, comprising:
   a main body portion formed into a shape of a thin plate or a sheet;
   a plurality of long convex portions provided on a surface portion of the main body portion in a parallel manner; and
   a plurality of bending portions each having the plurality of the long convex portions, and being configured in a way such that any one of a one side surface portion and other side surface portion of the main body portion has a concavo-convex shape, whereas the other of the one side surface portion and other side surface portion of the main body portion has a flat shape, wherein
   the long convex portions are formed thicker than the main body portion, and are extendedly provided in a direction orthogonal to a stretching and contracting direction of the connection member,
   the plurality of the long convex portions are provided on the one side surface portion and on the other side surface portion, and the plurality of the long convex portions provided on the one side surface portion are arranged in a location not opposing the plurality of the long convex portions provided on the other side surface portion, and
   as the first attachment receiving portion and the second attachment receiving portion approach each other, the bending portion is to be bent in a manner such that the plurality of the long convex portions are to be positioned inward.

2. The connection member according to claim 1, wherein the long convex portions are each formed into a shape of an isosceles trapezoidal pillar.

3. The connection member according to claim 1, wherein the long convex portions are extendedly provided over an entire width of the main body portion.

4. The connection member according to claim 1, wherein the main body portion and the long convex portions are integrally molded together using a flexible synthetic resin.

5. The connection member according to claim 1, wherein the bending portion having the plurality of the long convex portions is provided at one location.

6. The connection member according to claim 1, wherein the bending portion is provided at three locations; and the plurality of the long convex portions are arranged at one location on the one side surface portion, and at two locations on the other side surface portion.

7. The connection member according to claim 6, wherein the plurality of the long convex portions are alternately arranged on the one side surface portion and the other side surface portion from a one side end portion side of the main body portion toward an other side end portion side of the main body portion.

8. The connection member according to claim 1, wherein a given interval is present between adjacent bending portions.

9. The connection member according to claim 1, wherein the first attachment receiving portion is a seat back of a vehicle, and the second attachment receiving portion is a luggage room floor of the vehicle.

10. The connection member according to claim 2, wherein the long convex portions are extendedly provided over an entire width of the main body portion.

11. The connection member according to claim 2, wherein the main body portion and the long convex portions are integrally molded together using a flexible synthetic resin.

12. The connection member according to claim 3, wherein the main body portion and the long convex portions are integrally molded together using a flexible synthetic resin.

13. The connection member according to claim 6, wherein a given interval is present between adjacent bending portions.

14. The connection member according to claim 7, wherein a given interval is present between adjacent bending portions.

15. A connection member that is to be bridged between a first attachment receiving portion and a second attachment receiving portion and is capable of stretching and contracting as at least one of the first attachment receiving portion and the second attachment receiving portion moves, comprising:
   a main body portion formed into a shape of a thin plate or a sheet;
   a plurality of long convex portions provided on a surface portion of the main body portion in a parallel manner; and
   a bending portion having the plurality of the long convex portions, and being configured in a way such that any one of a one side surface portion and other side surface portion of the main body portion has a concavo-convex shape, whereas the other of the one side surface portion and other side surface portion of the main body portion has a flat shape, wherein
   the long convex portions are formed thicker than the main body portion, and are extendedly provided in a direction orthogonal to a stretching and contracting direction of the connection member, and
   as the first attachment receiving portion and the second attachment receiving portion approach each other, the bending portion is to be bent in a manner such that the plurality of the long convex portions are to be positioned inward,
   wherein the first attachment receiving portion is a seat back of a vehicle, and the second attachment receiving portion is a luggage room floor of the vehicle,
   wherein a one side end portion of the main body portion is to be fixed to the seat back, an other side end portion of the main body portion is to be fixed to an undersurface portion of the luggage room floor, and the one side end portion is to be positioned below an upper surface of the luggage room floor after raising the seat back.

16. The connection member according to claim 15, wherein the long convex portions are each formed into a shape of an isosceles trapezoidal pillar.

17. The connection member according to claim 15, wherein the long convex portions are extendedly provided over an entire width of the main body portion.

18. The connection member according to claim 15, wherein the main body portion and the long convex portions are integrally molded together using a flexible synthetic resin.

* * * * *